US011159315B2

(12) United States Patent
Patel et al.

(10) Patent No.: US 11,159,315 B2
(45) Date of Patent: Oct. 26, 2021

(54) GENERATING OR MANAGING LINKED DECENTRALIZED IDENTIFIERS

(71) Applicant: Microsoft Technology Licensing, LLC, Redmond, WA (US)

(72) Inventors: Ankur Patel, Sammamish, WA (US); Daniel James Buchner, Los Gatos, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 327 days.

(21) Appl. No.: 15/994,900

(22) Filed: May 31, 2018

(65) Prior Publication Data

US 2019/0228406 A1    Jul. 25, 2019

Related U.S. Application Data

(60) Provisional application No. 62/620,300, filed on Jan. 22, 2018, provisional application No. 62/626,564, filed on Feb. 5, 2018.

(51) Int. Cl.
*G06Q 20/40* (2012.01)
*G06Q 30/02* (2012.01)
(Continued)

(52) U.S. Cl.
CPC ...... *H04L 9/0894* (2013.01); *G06F 16/24578* (2019.01); *G06F 16/907* (2019.01);
(Continued)

(58) Field of Classification Search
CPC ......... H04L 9/00–38; H04L 63/00–308; H04L 2209/00–99; G06F 16/00–95;
(Continued)

(56) References Cited

U.S. PATENT DOCUMENTS 7,552,469 B2   6/2009  Diffie et al.
7,761,425 B1   7/2010  Erickson et al.
(Continued)

FOREIGN PATENT DOCUMENTS

CN   107480986 A   12/2017
EP     0534420 A2    3/1993
(Continued)

OTHER PUBLICATIONS

Ron White, How Computers Work, Oct. 2003, QUE (Year: 2003).*
(Continued)

*Primary Examiner* — John W Hayes
*Assistant Examiner* — Chenyuh Kuo
(74) *Attorney, Agent, or Firm* — Workman Nydegger

(57) ABSTRACT

Creating and managing linked decentralized identifiers for an entity. A parent decentralized identifier of an entity has an associated parent private key. A determination is made that a child decentralized identifier is to be created for the parent decentralized identifier. In response to the determination, the parent private key is used to generate a child private key, and a child decentralized identifier is created by at least assigning the generated child private key as the private key for the child decentralized identifier. Each of the decentralized identifiers may be associated with a permission to another entity. The permission associated with the child decentralized identifier may not be broader than the permission granted to the parent decentralized identifier.

15 Claims, 12 Drawing Sheets

(51) Int. Cl.

| | | |
|---|---|---|
| *G06Q 20/32* | (2012.01) | |
| *G06Q 20/34* | (2012.01) | |
| *G06Q 20/38* | (2012.01) | |
| *H04L 9/08* | (2006.01) | |
| *G06F 21/45* | (2013.01) | |
| *G06F 21/33* | (2013.01) | |
| *G06F 16/901* | (2019.01) | |
| *H04L 9/32* | (2006.01) | |
| *G06F 16/907* | (2019.01) | |
| *G06F 16/2457* | (2019.01) | |
| *H04L 29/06* | (2006.01) | |
| *G06Q 20/36* | (2012.01) | |
| *H04L 9/06* | (2006.01) | |
| *H04L 9/14* | (2006.01) | |
| *H04L 9/30* | (2006.01) | |
| *G06F 21/62* | (2013.01) | |

(52) U.S. Cl.
CPC .......... *G06F 16/9014* (2019.01); *G06F 21/33* (2013.01); *G06F 21/45* (2013.01); *G06F 21/6218* (2013.01); *G06Q 20/3674* (2013.01); *G06Q 20/3821* (2013.01); *G06Q 20/3829* (2013.01); *H04L 9/0637* (2013.01); *H04L 9/083* (2013.01); *H04L 9/0869* (2013.01); *H04L 9/0891* (2013.01); *H04L 9/14* (2013.01); *H04L 9/30* (2013.01); *H04L 9/321* (2013.01); *H04L 9/3236* (2013.01); *H04L 9/3239* (2013.01); *H04L 9/3247* (2013.01); *H04L 63/08* (2013.01); *H04L 63/102* (2013.01); *H04L 63/20* (2013.01); *G06F 2221/2131* (2013.01); *G06F 2221/2141* (2013.01); *H04L 2209/38* (2013.01)

(58) Field of Classification Search
CPC ............ G06F 21/00–88; G06F 2221/00–2153; G06Q 20/00–425
See application file for complete search history.

(56) References Cited

U.S. PATENT DOCUMENTS

| | | | |
|---|---|---|---|
| 7,827,147 | B1 | 11/2010 | D'Hoye et al. |
| 8,245,271 | B2 | 8/2012 | Chan et al. |
| 8,566,952 | B1 | 10/2013 | Michaels |
| 8,769,271 | B1 | 7/2014 | Osmond et al. |
| 8,806,218 | B2* | 8/2014 | Hatakeda ................ H04L 63/10 713/182 |
| 8,931,054 | B2 | 1/2015 | Huynh et al. |
| 9,251,114 | B1 | 2/2016 | Ancin et al. |
| 9,424,400 | B1 | 8/2016 | Blankenbeckler et al. |
| 9,959,522 | B2* | 5/2018 | Kenna, III ............. G06Q 10/10 |
| 9,992,028 | B2* | 6/2018 | Androulaki .......... H04L 9/0833 |
| 2002/0156726 | A1 | 10/2002 | Kleckner et al. |
| 2003/0070072 | A1 | 4/2003 | Nassiri |
| 2006/0212931 | A1 | 9/2006 | Shull et al. |
| 2007/0074027 | A1* | 3/2007 | Tung ..................... H04L 9/3247 713/176 |
| 2007/0245149 | A1 | 10/2007 | Lin |
| 2007/0252001 | A1 | 11/2007 | Kail et al. |
| 2009/0158041 | A1 | 6/2009 | Kang et al. |
| 2009/0300723 | A1 | 12/2009 | Nemoy et al. |
| 2009/0300742 | A1 | 12/2009 | Ahn |
| 2010/0145997 | A1 | 6/2010 | Zur et al. |
| 2010/0199098 | A1 | 8/2010 | King |
| 2015/0172286 | A1 | 6/2015 | Tomlinson et al. |
| 2017/0180128 | A1 | 6/2017 | Lu |
| 2017/0222814 | A1 | 8/2017 | Oberhauser et al. |
| 2017/0317833 | A1 | 11/2017 | Smith et al. |
| 2017/0317834 | A1 | 11/2017 | Smith et al. |
| 2018/0307853 | A1* | 10/2018 | Mehta .................. H04L 9/0891 |
| 2019/0229909 | A1 | 7/2019 | Patel et al. |
| 2019/0229914 | A1 | 7/2019 | Patel et al. |
| 2019/0230073 | A1 | 7/2019 | Patel et al. |
| 2019/0230092 | A1 | 7/2019 | Patel et al. |

FOREIGN PATENT DOCUMENTS

| | | |
|---|---|---|
| WO | 2010019916 A1 | 2/2010 |
| WO | 2017145049 A1 | 8/2017 |

OTHER PUBLICATIONS

Andreas M. Antonopoulos, Mastering Bitcoin, Dec. 2014, O'Reilly Media, Inc., pp. 88-99 (Year: 2014).*

"Creative Commons", Retrieved from: https://creativecommons.org/licenses/by/3.0/, Retrieved on Jan. 22, 2018, 1 Page.

"Flaticon", Retrieved from: https://www.flaticon.com/, Retrieved on Jan. 22, 2018, 14 Pages.

"Freepik", Retrieved from: https://www.freepik.com/, Retrieved on Jan. 22, 2018, 18 Pages.

"Notice of Allowance issued in U.S. Appl. No. 15/994,893", dated Mar. 26, 2020, 13 Pages. (MS# 403731-US-NP).

Tang, et al., "Efficient Multi-Party Digital Signature Using Adaptive Secret Sharing for Low-Power Devices in Wireless Networks", In Proceedings of IEEE Transactions on Wireless Communications vol. 8 , Issue: 2, Feb. 20, 2009, pp. 882-889.

"Non Final Office Action Issued in U.S. Appl. No. 15/994,337", dated Feb. 3, 2020, 8 Pages. (MS# 404645-US-NP).

"Non Final Office Action Issued in U.S. Appl. No. 15/994,893", dated Jan. 7, 2020, 33 Pages. (MS# 403731-US-NP).

"International Search Report and Written Opinion Issued in PCT Application No. PCT/US19/013558", dated Apr. 9, 2019, 12 Pages (MS# 403731-WO-PCT).

"International Search Report and Written Opinion Issued in PCT Application No. PCT/US19/013559", dated Apr. 8, 2019, 11 Pages (MS# 404643-WO-PCT).

"International Search Report and Written Opinion Issued in PCT Application No. PCT/US19/013560", dated Apr. 8, 2019, 11 Pages. (MS# 404645-WO-PCT).

"International Search Report and Written Opinion Issued in PCT Application No. PCT/US19/013562", dated Apr. 16, 2019, 6 Pages. (MS# 404644-WO-PCT).

Gutoski, et al., "Hierarchical Deterministic Bitcoin Wallets that Tolerate Key Leakage", In Proceedings of International Conference on Financial Cryptography and Data Security, Jan. 26, 2015, 9 Pages.

"International Search report Issued in PCT Application No. PCT/US2019/013561", dated Jul. 3, 2019, 12 Pages. (MS# 403783-WO-PCT).

"Non-Final Office Action Issued in U.S. Appl. No. 15/994,331", dated Jul. 17, 2020, 9 Pages. (MS# 404643-US-NP).

* cited by examiner

-----BEGIN RSA PRIVATE KEY-----
MIIBOgIBAAJAcynbvbo1OTqsTZEdfTP5POyJ4y6HMsdOVhwivI/842dDPz3pZrCr
XZMyceutF2SdEF8HawFeZAdh+0sfXtAgJQIDAQABAkBKDoDgYP4Y70IeH1N3UBTW
uMVy8li+rqwRc8Ziu7VEBiKWpYoAlnEhzHTzH9zNTUipFco9k7QWyJWcwhHK/ngB
AiEA0H2ehAiet46YKyBSqhBbNpQ8tZxZa42A3coAD1OeJfECIQCNZ/arTrYYyb83
I5jqQthIahDm+W6xdIO1JOdBudhZdQIhALbARgBqJeW0AkJbNNqJN8rhqU1v3Rnf
kUPX2rGUIB2hAiAMYoqsPIycly70OV3vRqOC1Cde04HqcR6rwuuuSgS08QIhAIr4
X9GQW2TnafzfbKLsu9fqZYDIoR3Z+ea8UI3C+gTh
-----END RSA PRIVATE KEY-----

-----BEGIN PUBLIC KEY-----
MFswDQYJKoZIhvcNAQEBBQADSgAwRwJAcynbvbo1OTqsTZEdfTP5POyJ4y6HMsdO
Vhwivl/842dDPz3pZrCrXZMyceutF2SdEF8HawFeZAdh+0sfXtAgJQIDAQAB
-----END PUBLIC KEY-----

300B

301B

302B

GENERATING OR MANAGING LINKED DECENTRALIZED IDENTIFIERS

CROSS-REFERENCE TO RELATED APPLICATIONS

This application claims priority to U.S. Provisional Application Ser. No. 62/620,300, filed on Jan. 22, 2018 and entitled "DECENTRALIZED IDENTITY PLATFORM," and U.S. Provisional Application Ser. No. 62/626,564, filed on Feb. 5, 2018 and entitled "DECENTRALIZED IDENTITY PLATFORM," which two provisional patent applications are hereby incorporated herein by reference in their entireties.

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments describe here relate to creating and managing linked decentralized identifiers for an entity. A parent decentralized identifier of an entity has an associated parent private key. A determination is made that a child decentralized identifier is to be created for the parent decentralized identifier. In response to the determination, the parent private key is used to generate a child private key, and a child decentralized identifier is created by at least assigning the generated child private key as the private key for the child decentralized identifier.

Each of the decentralized identifiers (including the parent decentralized identifier and the child decentralized identifier) may be associated with a permission to another entity. Each of the permissions defines a scope of data and an associated permitted use of that scope of data. The permission associated with the child decentralized identifier may not be broader than the permission granted to the parent decentralized identifier. Similarly, more than one child decentralized identifier may be generated by the parent decentralized identifier, and each of the child decentralized identifiers may be used to generate one or more grandchild decentralized identifiers.

Unlike collections of randomly generated decentralized identifiers, which are cumbersome to manage (including but not limited to back up, import and export), collections of child decentralized identifiers generated by a parent decentralized identifier allows a decentralized identifier management system to maintain only the parent decentralized identifier. In particular, if an entity has many decentralized identifiers including randomly generated keys, the entity or the decentralized identifier management system must keep copies of each of the decentralized identifiers; and when a randomly generated decentralized identifier is lost, the control of the permission associated with the decentralized identifier may be irrevocably lost.

The principles described herein allow an entity to recover and/or revoke all the derived child decentralized identifiers and grandchild decentralized identifiers, and therefore a backup of the parent decentralized identifier is sufficient. The parent decentralized identifier is also sufficient for an entity to export or import all of its decentralized identifiers, allowing for easy migration of all the entity's decentralized identifiers between different decentralized identifier management systems. Furthermore, the private keys of each of the child and grandchild decentralized identifiers may never need to be stored permanently anywhere. Whenever an operation uses a private key of a child or grandchild decentralized identifier, the parent decentralized identifier can regenerate the private key for the operation and delete the private key after the operation, which increases the security of the operation and the decentralized identifier management system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates a private key of a decentralized identifier;

DETAILED DESCRIPTION

Figure 1:
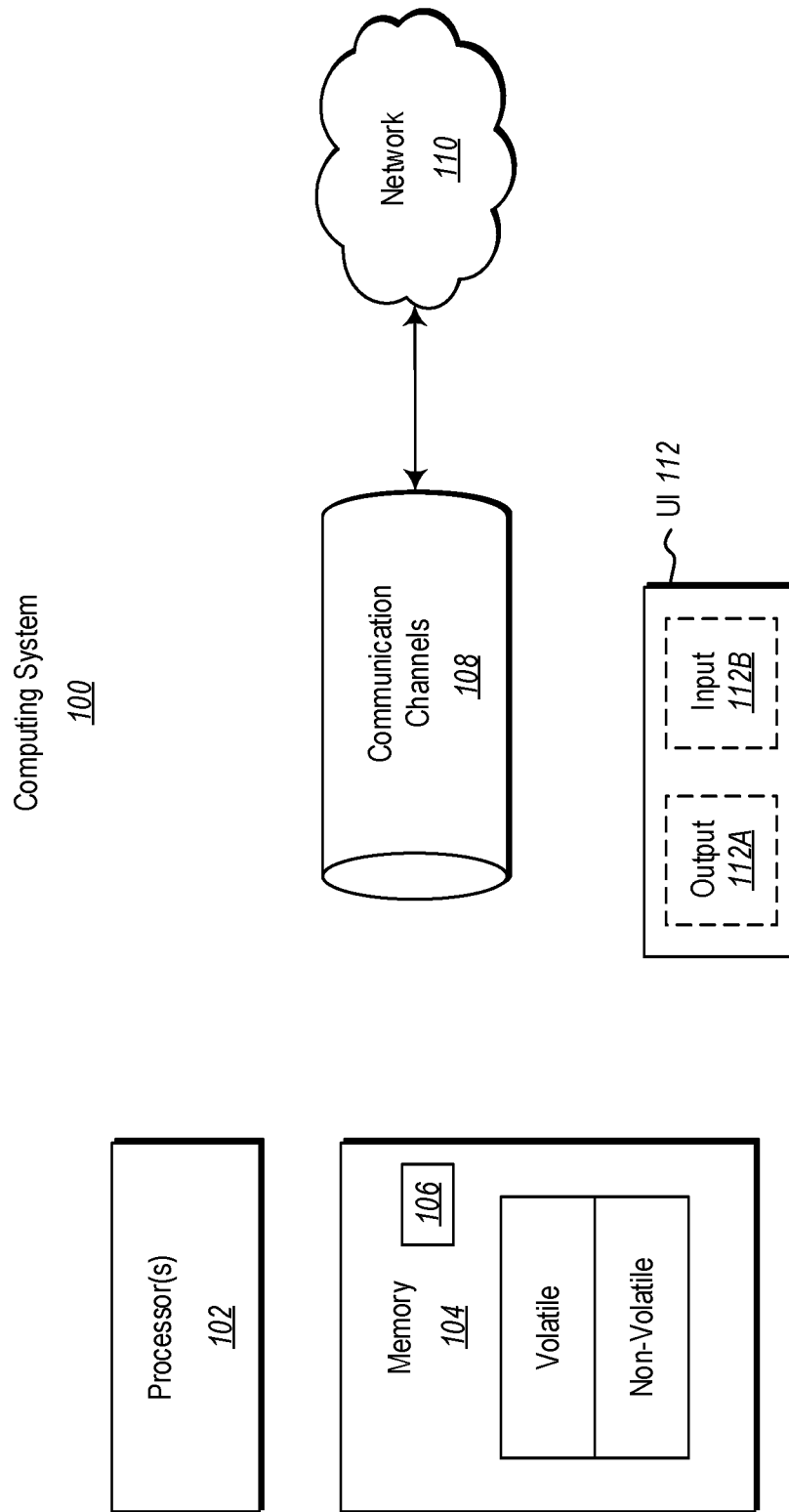
FIG. 1 illustrates an example computer system in which the principle described herein may be employed.

At least some embodiments describe here relate to creating and managing linked decentralized identifiers for an entity. A parent decentralized identifier of an entity has an associated private key, which will be called herein a "parent private key". A determination is made that a child decentralized identifier is to be created for the parent decentralized identifier. In response to the determination, the parent private key is used to generate a child private key, and a child decentralized identifier is created by at least assigning the generated child private key as the private key for the child decentralized identifier.

Each of the decentralized identifiers (including the parent decentralized identifier and the child decentralized identifier) may be associated with a permission to another entity. Each of the permissions defines a scope of data and an associated permitted use of that scope of data. The permission associated with the child decentralized identifier may not be broader than the permission granted to the parent decentralized identifier. Similarly, more than one child decentralized identifier may be generated by the parent decentralized identifier, and each of the child decentralized identifiers may be used to generate one or more grandchild decentralized identifiers.

Unlike collections of randomly generated decentralized identifiers, which are cumbersome to manage (including but not limited to back up, import and export), collections of child decentralized identifiers generated by a parent decentralized identifier allows a decentralized identifier management system to maintain only the parent decentralized identifier. In particular, if an entity has many decentralized identifiers including randomly generated keys, the entity or the decentralized identifier management system must keep copies of each of the decentralized identifiers; and when a randomly generated decentralized identifier is lost, the control of the permission associated with the decentralized identifier may be irrevocably lost.

The principles described herein allow an entity to recover and/or revoke all the derived child decentralized identifiers and grandchild decentralized identifiers, and therefore a backup of the parent decentralized identifier is sufficient. The parent decentralized identifier is also sufficient for an entity to export or import all of its decentralized identifiers, allowing for easy migration of all the entity's decentralized identifiers between different decentralized identifier management systems. Furthermore, the private keys of each of the child and grandchild decentralized identifiers may never need to be stored permanently anywhere. Whenever an operation uses a private key of a child or grandchild decentralized identifier, the parent decentralized identifier can regenerate the private key for the operation and delete the private key after the operation, which increases the security of the operation and the decentralized identifier management system.

Because the principles described herein operate in the context of a computing system, a computing system will be described with respect to FIG. 1.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries. On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within the peer-to-peer system to then take action based on the authentication.

Figure 2:
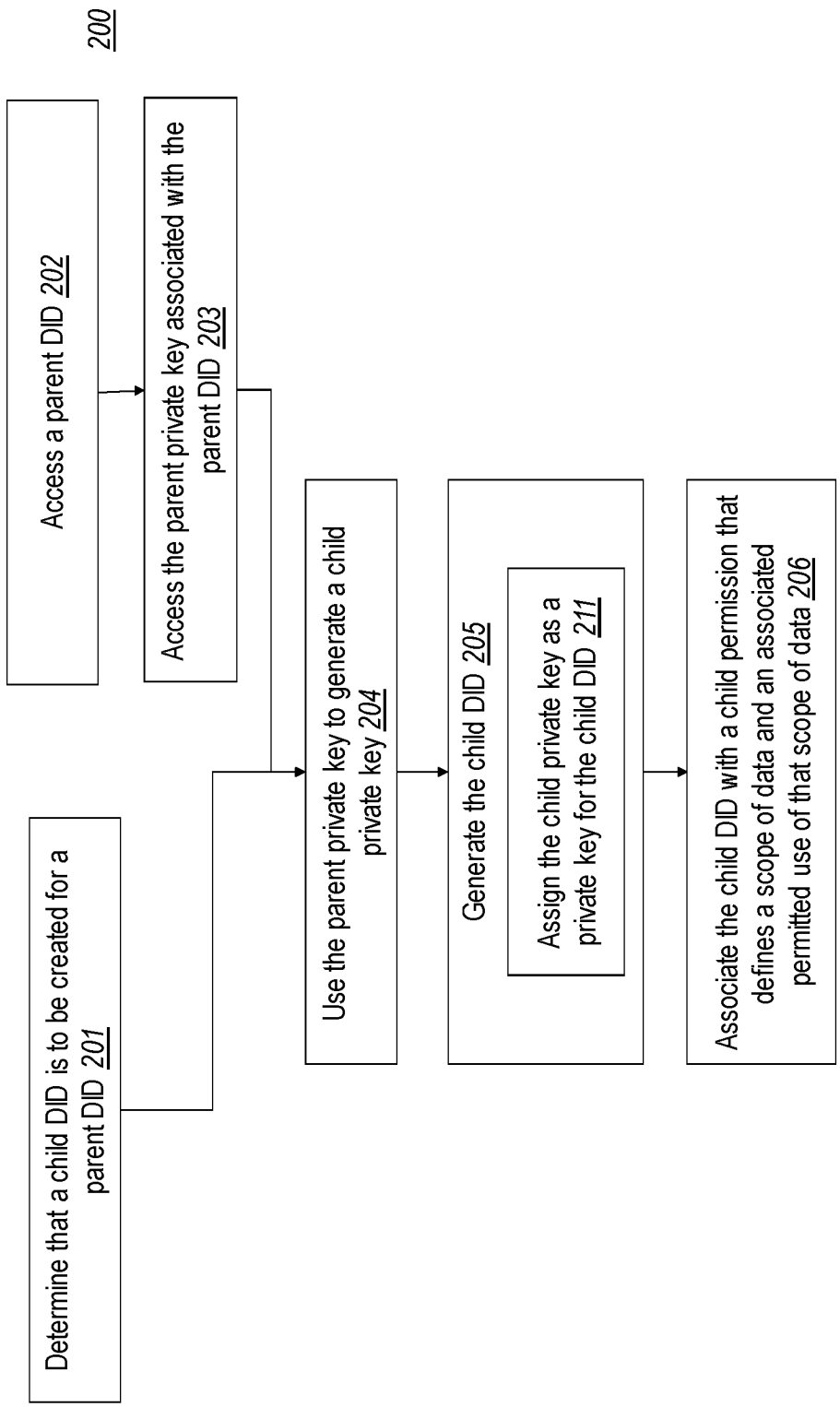
FIG. 2 illustrates a flowchart of a method for generating a first child decentralized identifier from a parent decentralized identifier of an entity.

A computing system may be used to generate and/or manage linked decentralized identifiers for entities. Such a computing system may be, for instance, the computing system 100 that is described above with respect to FIG. 1, and may be hereinafter be referred to as the "DID management system" or simply the "system". FIG. 2 illustrates a flowchart of a method 200 for creating and managing linked decentralized identifiers for an entity. The method 200 may be performed by the computing system 100 of FIG. 1. For instance, the method 200 may be performed by the DID management system.

In this description and in the claims, "linked" decentralized identifiers are a set of decentralized identifiers in which one decentralized identifier (called in a "child" decentralized identifier) is derived from another decentralized identifier (called herein a "parent" decentralized identifier). Furthermore, public and private keys that are associated with a parent decentralized identifier will be referred as "parent" public and private keys. Public and private keys that are associated with the child decentralized identifier will be referred to as the "child" public and private keys.

When two decentralized identifiers are derived from the same parent decentralized identifier, those two derived decentralized identifiers will also be referred herein as "sibling" decentralized identifiers with respect to each other. A child decentralized identifier may likewise be used to derive yet another decentralized identifier, which would be a "grandchild" decentralized identifier to the original parent decentralized identifier). Thus, the terminology used to describe human relationships will be borrowed to describe relationships between directly or indirectly linked decentralized identifiers.

Referring to FIG. 2, first, the system determines that a child decentralized identifier is to be created for a parent decentralized identifier (act 201). Also, the system accesses a parent decentralized identifier (act 202), and accesses a private key (i.e., a "parent private key") associated with the parent decentralized identifier (act 203). The accessing of the parent private key (act 203) does occur after accessing the parent decentralized identifier (act 202). Thus, the acts 202 and 203 are shows a sequentially occurring in FIG. 2. However, the principles described herein are not limited to whether the parent decentralized identifier and associated private key (acts 202 and 203) occur before, after, and/or during the time that the system determines that a child decentralized identifier is to be created for that parent decentralized identifier (act 201). Thus, act 201 is show as in parallel with acts 202 and 203 to symbolize this flexibility.

Entities may choose to access an existing parent decentralized identifier (act 202) by importing an existing parent decentralized identifier into the system. Multiple ways may be used to import an existing parent decentralized identifier. Examples include scanning a QR code, or entering the hexadecimal code, where the code represents information from which the parent decentralized identifier may be accessed. Alternatively or in addition, mnemonics used to generate a seed (called herein a "parent seed") that is further used to generate the parent private key. The details of generating parent private key using a seed and mnemonics are further discussed below. If a user does not have an existing parent decentralized identifier, or prefers not to import an existing parent decentralized identifier, the DID management system may generate a parent decentralized identifier for the entity.

Of course, using the term "parent" decentralized identifier at this stage may be a bit premature, as the "parent" decentralized identifier may not yet having any child decentralized identifiers. Nevertheless, because the principles described herein are used to generate at least one child decentralized identifier from that parent decentralized identifier, the original decentralized identifier is still termed a "parent" decentralized identifier to distinguish it as the source of creation.

After accessing the parent decentralized identifier (act 202), the system acquires the parent private key from the parent decentralized identifier (act 203). A parent decentralized identifier may include a private key (which we will call a "parent" private key) and a public key (which we will call a "parent" public key). The parent private key is used to sign the permission granted to the parent decentralized identifier. The public key thereafter may be used to authenticate the signed permission.

Figure 3B:
FIG. 3B illustrates a public key of a decentralized identifier corresponding to the private key illustrated in FIG. 3A.

The principles described herein are not limited to the format of the private key or the public key. As examples only, the private key and public key might be raw binary format, hexadecimal format, and a Quick Response (QR) code. FIG. 3A shows an example of a private key that is represented in two different formats. This private key 301A could be an example of a parent private key or a child private key, though the principles described herein are not limited to any particular format for the keys. The private key 301A is in hexadecimal format with additional header and footer lines. The private key 302A represented the exact same private key, but in a different format—a QR format. Likewise, FIG. 3B shows an example of a public key that is represented in two different formats. The public key 301B is in hexadecimal format with additional header and footer lines. The public key 302B represented the exact same public key, but in the QR format. The hexadecimal format allows the keys to be easily transmitted as part of electronic communications. QR formats (or any barcode format) is beneficial in cases in which the key is to be scanned for quick input. If the parent decentralized identifier does not already include a parent private key, a parent private key will be generated for the parent decentralized identifier. More regarding a particular method for generating the parent private key will be described with respect to FIG. 4. Returning to FIG. 3.

Returning to FIG. 2, in response to the determination that the child decentralized identifier is to be created (act 201), and after acquiring the parent private key (act 203), the system uses the parent private key to generate another child private key (act 204) (which we will call a "child" private key). This may be accomplished by feeding the parent private key into a one-way cryptographic function to generate the child private key. The one-way cryptographic function is practically irreversible, meaning that it is easy to calculate in one direction (e.g., to calculate the child private key from the parent private key) and is infeasible to calculate in the opposite direction (e.g., to calculate the parent private key from the child private key). The one-way cryptography enables encryption and the generation of digital signatures. Then, a child decentralized identifier is generated (act 205) at least by assigning the child private key as the private key for the child decentralized identifier (act 211). Finally, the child decentralized identifier is associated with a child permission that defines a scope of data and an associated permitted use of that scope of data (act 206).

Figure 4:
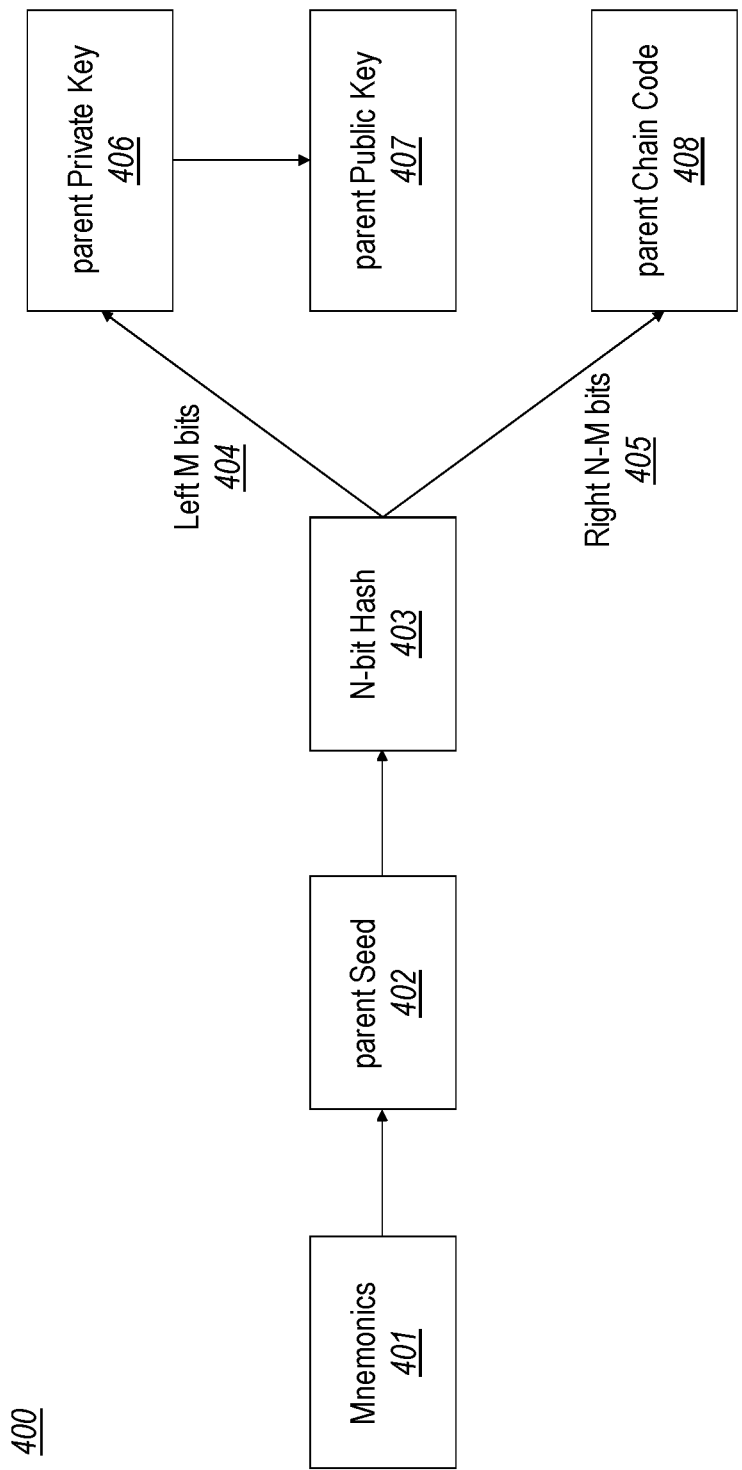
FIG. 4 illustrates an example process of generating a parent decentralized identifier of an entity.

FIG. 4 illustrates an example process of generating a parent private key, which may be used as part of act 203 of FIG. 2 in the case in which the accessed parent decentralized identifier does not already include a parent private key. Referring to FIG. 4, as an example, the mnemonics 401 are used to generate a parent seed 402. The parent seed may be a randomly (or pseudo-randomly) generated number. Such a seed is beneficial as it is difficult to guess. A mnemonic is simply sequence of human readable words called mnemonic. These mnemonics may be chosen randomly from a dictionary of pre-determined words in a particular language (e.g., English, Spanish, Chinese, etc.). These mnemonics may also be based on a list of questions the user answers or based on a memorable story that the user tells. Thus, the user may be capable of using the system to regenerate the parent seed 402 if needed.

The parent seed 402 is then used to generate an N-bit hash 403 through a one-way cryptographic hash function. N may be a natural number, as long as it is sufficiently long to meet the security requirement of the system or the user's desire. In some embodiments, N may be a number that is power of 2, such as 128, 256, 512, etc. The N-bit hash 403 may be split to left M bits 404 and right N−M (N minus M) bits 405 (where M is also a natural number that is less than M). The left M bits 404 of the N-bit hash 403 may be used to generate the parent private key 406; and the right N−M bits 405 of the N-bit hash 403 may be used to generate the parent chain code 408. The parent private key 406 is then used to derive the parent public key 407. The parent chain code 408 may be used to derive child decentralized identifiers, which will be further discussed in FIG. 5 below.

If needed, the private master key can be regenerated using the same one-way hash function from the parent seed. Therefore, there is no need to store the derived parent private key permanently, and a single backup of the parent seed at creation time is sufficient (though even the parent seed may be recreated from a mnemonic if even that is lost). Whenever the parent private key is needed, the system can retrieve the parent seed and regenerate the master private key. Using a seed to generate a master private key and storing the seed instead of the private key may provide a higher level of security to the entity.

Referring back to FIG. 4, in some embodiments, a child private key is derived from the parent private key 406, a parent chain code 408, and an index number. The index is 0 or a sequential (e.g., monotonically increasing) natural number used to identify each of the child keys. For instance, the first child key may be generated using an index number 0; the second child key may be generated using an index number 1; and so on and so forth. The parent chain code may be used as a seed to introduce deterministic random data to the process. The deterministic random data is perceived as random to another party, but not truly random, because it is derived from the parent chain code as a seed. As such, knowing the index and a child private key is not sufficient to derive other child private keys (i.e., sibling keys) unless the chain code is also known.

As illustrated in FIG. 4, both the parent private key and the parent chain code may be generated from the same parent seed. In some embodiments, a one-way hash function may be used to generate parent private key 406 and/or the parent chain code 408 from the left M bits 404 of the hash 403 and/or the right N−M bits 405 of the hash 403. In some embodiments, the left M bits 404 of the hash 403 and/or the right N−M bits 405 of the hash 403 may simply be used as parent private key 406 and/or the parent chain code 408 without applying additional hash functions.

For example, N may be 512, and M may be 256. Accordingly, the hash 403 is 512-bit long, and the 512-bit long hash 403 is split into two 256-bit halves (because M is 256, and N−M is also 256). The left-half 256 bits 404 of the hash 403 is used to generate the parent private key. The right-half 256 bits 405 of the hash 403 is used to generate the chain code for the parent private key, which may be used to generate child keys.

The parent private key may be assigned to a parent decentralized identifier that is associated to a permission (hereinafter referred to as parent permission). In some embodiments, the transactions involving the parent decentralized identifier may be recorded in a distributed ledger. In some embodiments, the parent decentralized identifier may be used only in peer-to-peer communications, such that the transactions involving the parent decentralized identifier may not be recorded in a distributed ledger. In some embodiments, the parent decentralized identifier is merely used to create and manage child decentralized identifier.

Figure 5:
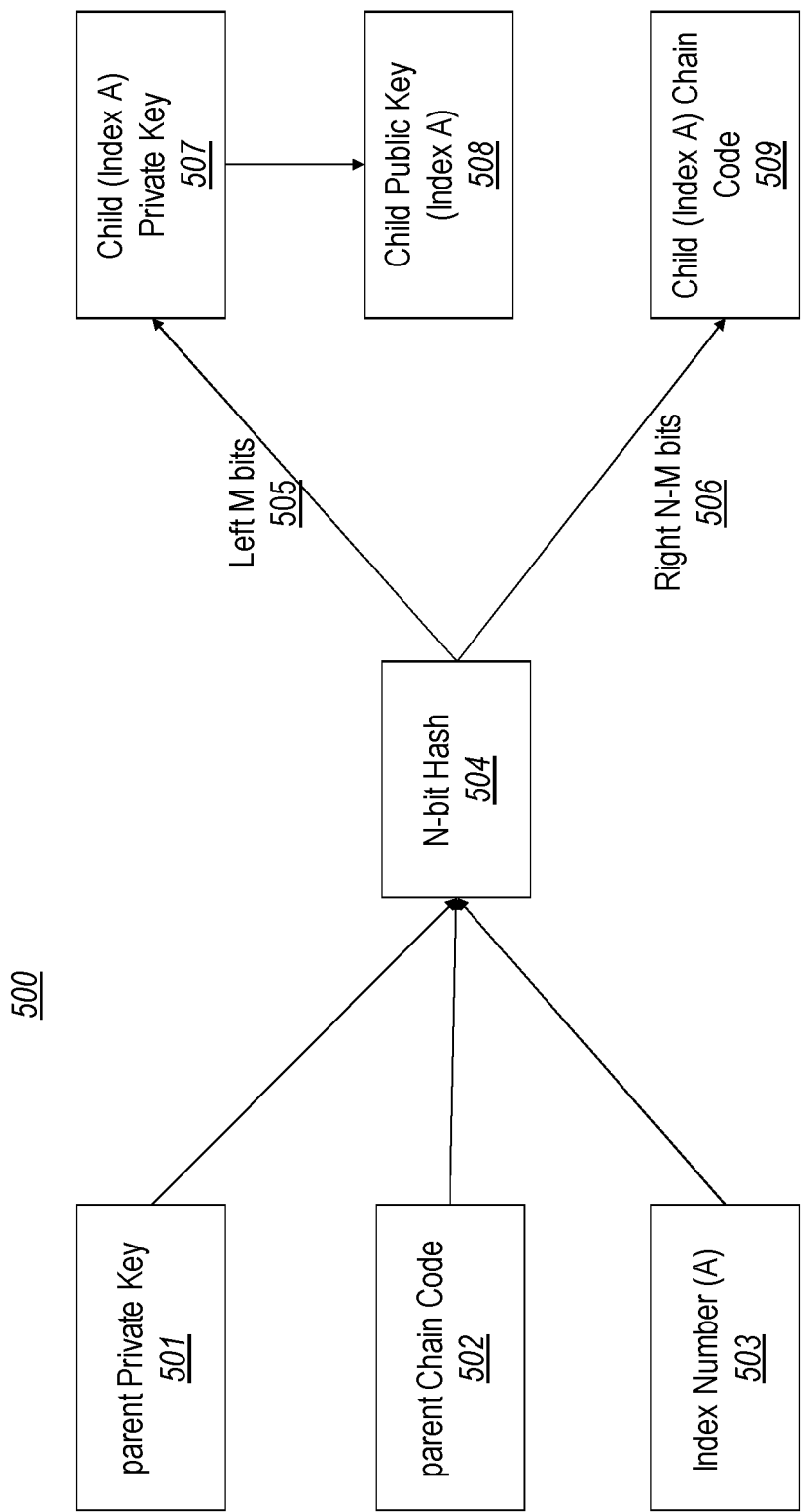
FIG. 5 illustrates an example process of generating a child decentralized identifier from a parent decentralized identifier of an entity.

The parent private key, the parent chain code and an index number may then be used to generate child keys. Referring to FIG. 5, the parent private key 501 and the parent chain code 502 may be the parent private key 406 and parent chain code 408 generated using the parent seed 402 in FIG. 4. The index number (A) 503 is 0 or any natural number that is used to index the derived child keys.

As illustrated in FIG. 5, the parent private key 501, the parent chain code 502 and the index number (A) 503 may be used as the input to produce an N-bit hash 504. Then, the left M bits 505 of the N-bit hash 504 is used to generate the child private key with an index number A; and the right N–M bits 506 of the N-bit hash 504 is used to generate the child chain code with an index number A. The child private key with an index number A 507 is then used to derive the child public key with an index number A 608.

For example, N may be 512, M may be 256, and A may be 0. Accordingly, the hash 504 is 512-bit long; the index number is 0, which means that the child key to be generated is the first child key; and the 512-bit long hash is split into two 256-bit halves (because M is 256, and N–M is also 256). The left-half 256 bits 505 of the hash 604 is used to generate the first private key 507. The right-half 256 bits of the hash is used to generate the first child chain code 509, which may later be used to generate grandchild keys. The first child private key 507 is then used to generate the first child public key 508.

In some embodiments, similarly as the process of generating the parent private key and parent chain code, a one-way hash function may be used to generate child private key 507 and/or the child chain code 509 from the left M bits 505 of the hash 504 and/or the right N–M bits 506 of the hash 504. In some embodiments, the left M bits 505 of the hash 504 and/or the right N–M bits 506 of the hash 504 may simply be used as the child private key 507 and/or the child chain code 509 without applying additional hash functions.

Referring back to FIGS. 2 and 5, after the first child key pair 507, 508 (act 202) is generated, the system may create a child decentralized identifier (act 203) by at least assigning the first child private key 507 as a private key of the first child decentralized identifier (act 204). The first child DID is then associated with a first child permission associated with data (act 205). The first child permission includes at least the scope of data, and a permitted use that includes at least the permitted use of that scope of data. In some embodiments, the first child permission is a subset of permission granted to the parent decentralized identifier.

Figure 6:
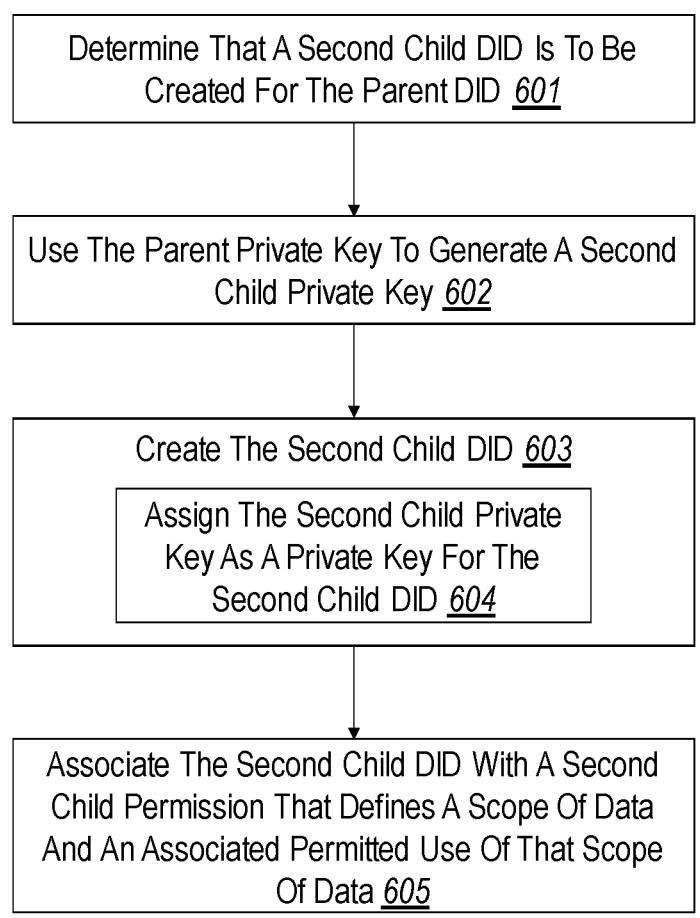
FIG. 6 illustrates a flowchart of a method for generating a second child DID for a parent decentralized identifier of an entity.

Referring to FIG. 6, the method may further include determining that a second child decentralized identifier is to be created for the parent decentralized identifier (act 601). In response to the determination, a second child private key is being generated by the parent private key (act 602) through the similar process described in FIG. 5. The second child decentralized identifier is then generated (act 603) by at least assigning the second child private key as a private key for the second child decentralized identifier (act 604). Finally, the second child decentralized identifier is being associated with a second child permission that defines a scope of data and an associated permitted use of that scope of data (act 605).

In some embodiments, the second child permission is also a subset scope of the parent permission. The first and the second child permissions may be the same or may be different. The first and second child permissions may overlap or not overlap with each other.

Referring back to FIG. 5, after the first child decentralized identifier is generated, the same parent private key 501, the parent chain code 502, may be used to generate a second child decentralized identifier through the same process. When generating the second child identifier, the index number (A) 503 will increase from "0" to "1".

Also similarly, a third, a forth, or an (A+1)th child decentralized identifier may be generated. Each time, a new child decentralized identifier is generated, the index number (A) 503 will increase by one. The (A+1)th child decentralized identifier is then associated with an (A+1)th child permission associated with data. The (A+1)th child permission also includes at least the scope of data and a permitted use of that scope of data. Similarly, the (A+1)th child permission may overlap or not overlap with each one of other A child permissions. Here, "A" may be 0 or any natural number. Each time a new child decentralized identifier is generated, the value of A increases by 1. The index number A may be recorded by the system. The index number A may be stored online or offline, on a user's device, or in cloud storages, etc. As such, any natural number (A+1) of child decentralized identifiers may be generated from the parent decentralized identifier.

Since the child private keys may be regenerated by the parent private key at any time, the child private key is not required to be persisted, that is, the child private keys may never need to be stored in a non-volatile memory media, be printed out, or be remembered in any way. Whenever a child private key is needed, the system can regenerate it using the parent private key on the fly. Accordingly, the principle described herein provides a higher level of security for protecting child private keys that are associated with child decentralized identifiers.

In some embodiments, the parent decentralized identifier is granted the broadest permission (i.e., parent permission), and each of the child decentralized identifiers is granted a sub-scope of the permission of the parent permission (hereinafter referred to as child permissions). Each of the child permissions may overlap or not overlap with each other.

Figure 7:
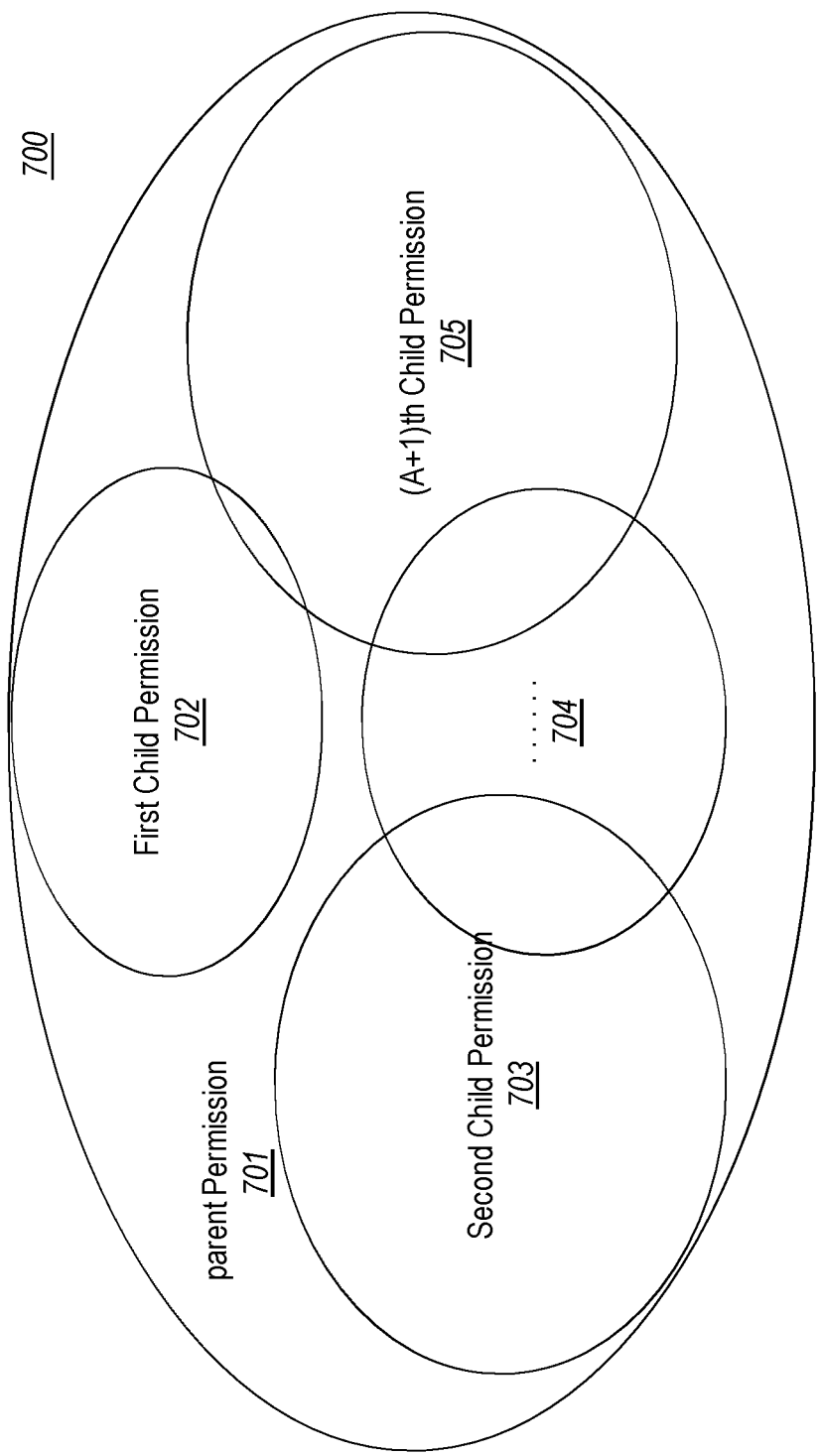
FIG. 7 illustrates example relations between a parent permission and its child permissions.

Referring to FIG. 7, the largest oval represents the parent permission 701, which is the scope of permission granted for the parent decentralized identifier. Each of the smaller ovals 702-705 represents the child permissions each of which is a scope of permission granted to the corresponding child decentralized identifiers. A is 0 or any natural number. The ellipsis 704 represents that there may be any natural number (A+1) of child permissions. Each of the child permissions 702-705 is a subset of the parent permission 701. Each of the A+1 child permissions 702-705 may be overlapping or not overlapping with each other. For example, as illustrated in FIG. 7, the first child permission 702 does not overlap with the second child permission 703, but overlaps with the (A+1)th child permission 705.

Figure 8:
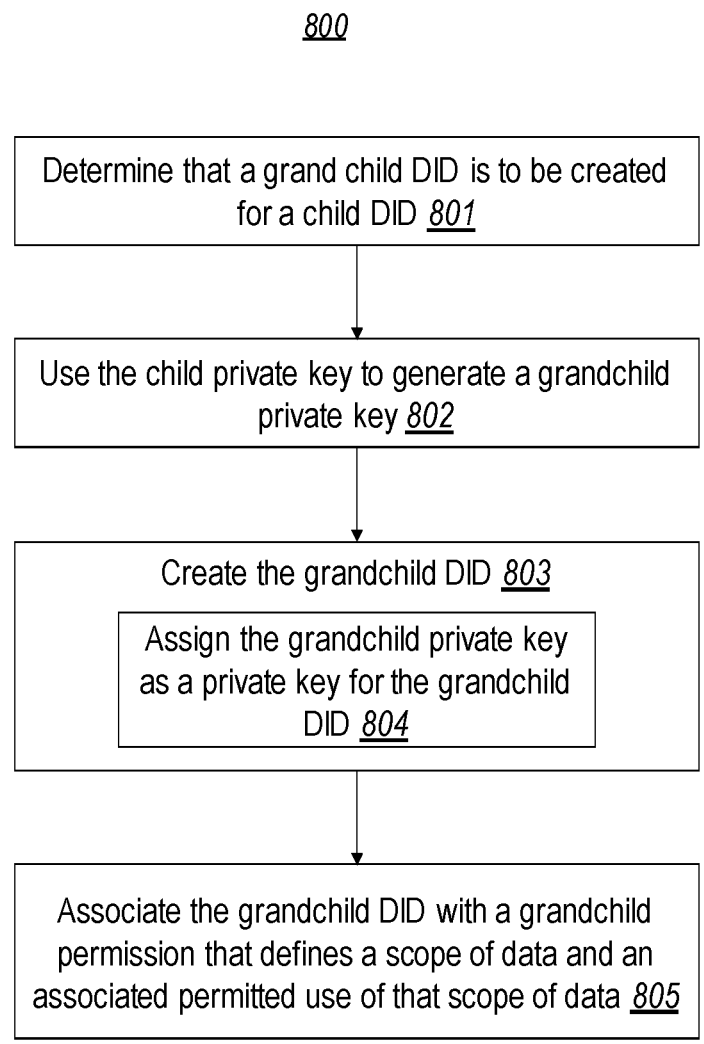
FIG. 8 illustrates a flowchart of a method for generating a first grandchild decentralized identifier for a child decentralized identifier of an entity.

Furthermore, each of the child decentralized identifiers may be used to generate one or more grandchild decentralized identifiers. Referring to FIG. 8, the method of creating and managing linked decentralized identifiers described herein may further include determining a grandchild decentralized identifier is to be created for a child decentralized identifier (act 801). In response to the determination, a grandchild private key is generated using the child private key (act 802). The grandchild decentralized identifier is then created (act 803) by at least assigning the grandchild private key as a private key for the grandchild decentralized identifier (act 804). Finally, the grandchild decentralized identifier is being associated with a grandchild permission that defines a scope of data and an associated permitted use of that scope of data (act 805). The permission granted to the grandchild decentralized identifier may be a sub-scope of permission of its parent decentralized identifier.

Figure 9:
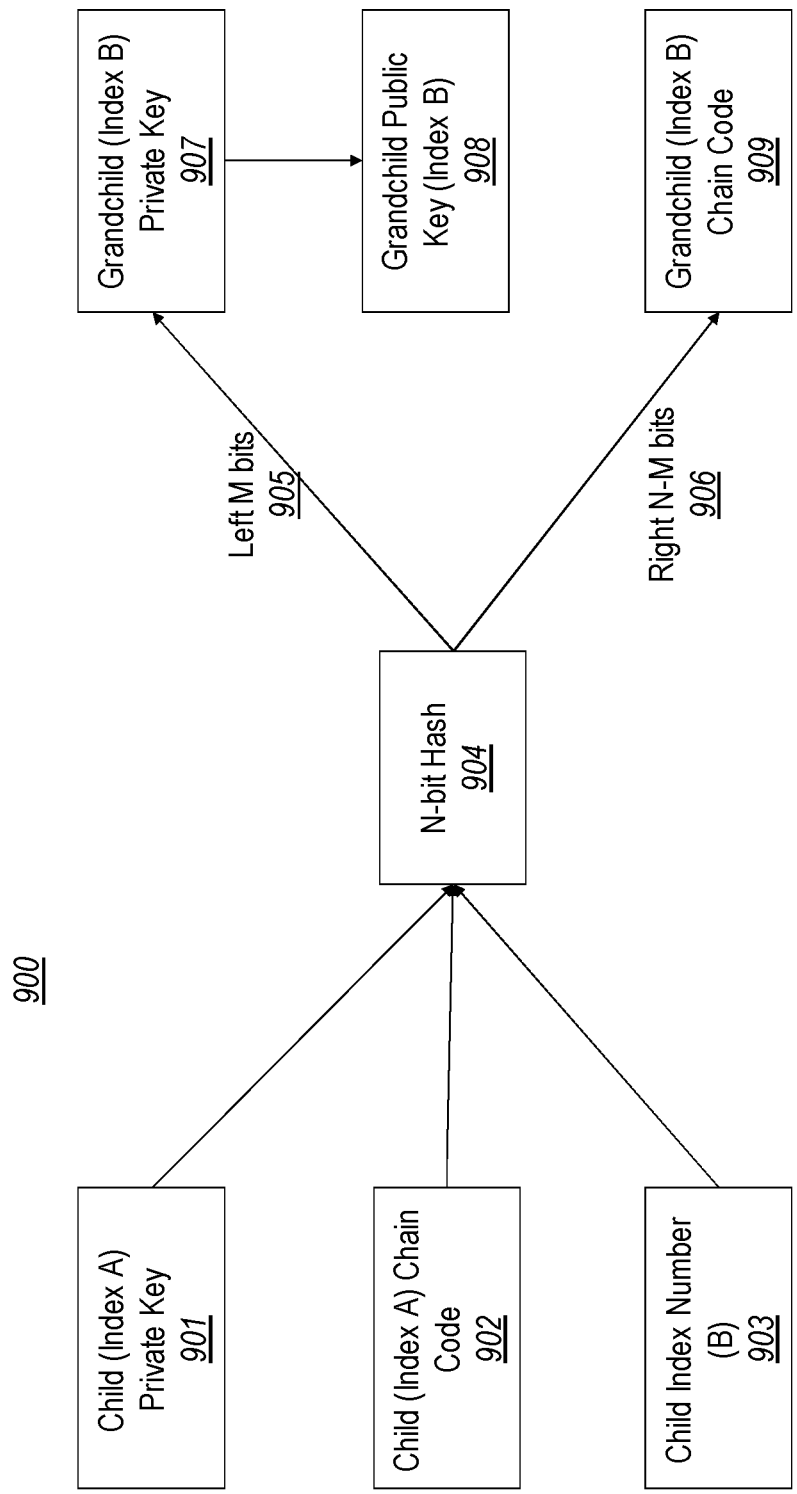
FIG. 9 illustrates an example process of generating a grandchild decentralized identifier from a child decentralized identifier.

Referring to FIG. 9, as an example, a grandchild private key may be generated using a child private key 901, a child chain code 902 and a child index number (B) 903. The child private key may have an index number A, i.e., the child private key is the (A+1)th child private key generated from the parent private key, as illustrated in FIG. 6. The grandchild may have an index number B 903, which means that the grandchild is the (B+1)th child of the child private key.

As illustrated in FIG. 9, the (A+1)th child private key 901, the chain code 902 corresponding to the (A+1)th child private key 901, and child index B 903 may be used as inputs of a hash function to generate a N-bit hash 904. The left M bits 905 of the N-bit hash 904 are used to generate the (B+1)th grandchild private key 907, and the right N−M bits 906 of the N-bit hash 904 are used to generate the (B+1)th grandchild chain code 909. The (B+1)th grandchild private key 907 can then be used to derive the (B+1)th grandchild public key 908.

For example, A is 0, and B is also 0. Accordingly, the child private key 901 is the private key corresponding to the first child decentralized identifier generated from the parent decentralized identifier. The child chain code 902 would be the child chain code generated together with the first child private key. Additionally, since B is 0, the grandchild private key 907 is the first grandchild private key generated by the first child private key 901.

Another example, A is 1, and B is 2. Accordingly, the child private key 901 is the second private key corresponding to the second child decentralized identifier generated from the parent decentralized identifier. The child chain code 902 would be the second child chain code generated together with the second private key. Additionally, since B is 2, the grandchild private key 907 is the third grandchild private key generated by the second child private key 901. Similarly, each of the child private keys corresponding to a child decentralized identifier may be used to derive one or more grandchild private keys corresponding to a grandchild decentralized identifier. Each of the grandchild decentralized identifier may then be associated with a permission.

Figure 10:
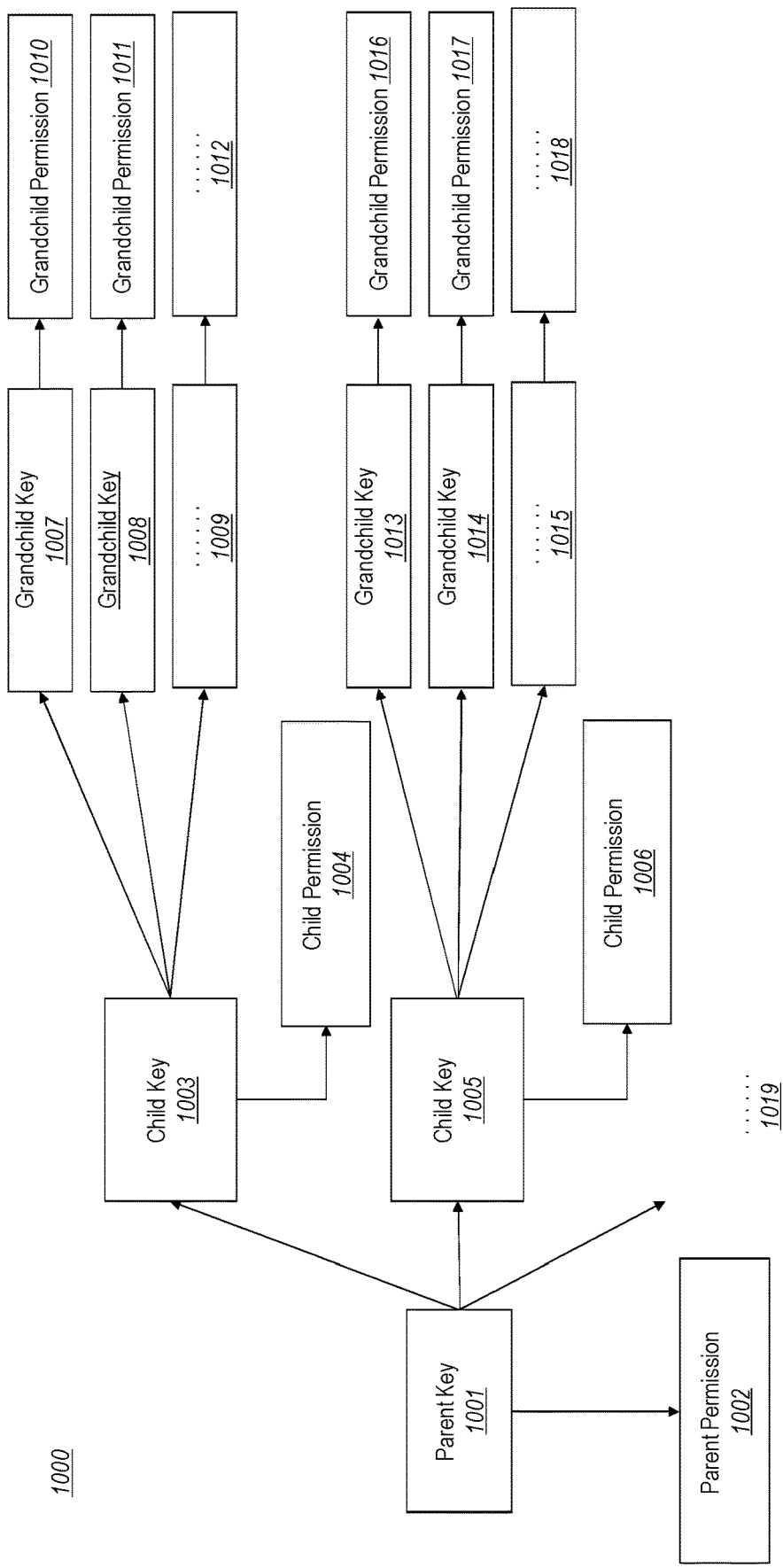
FIG. 10 illustrates an example environment in which a parent decentralized identifier including a parent key is assigned a parent permission, each of one or more child decentralized identifiers including a child key is assigned a child permission, and each of one or more grandchild decentralized identifiers including a grandchild key is assigned a grandchild permission.

Referring to FIG. 10, the parent private key 1001 is associated with a permission 1002 that is granted to a parent decentralized identifier (i.e., parent permission). The parent private key 1001 derives one or more child private keys 1003, 1005 and 1019. The ellipsis 1019 represents that the number of child private keys derived from the parent private key 1001 may be any natural number. The child private key 1003 is then associated with a permission 1004 that is granted to the child decentralized identifier (i.e., child permission), and the child private key 1005 is associated with a child permission 1005 that is granted to another child decentralized identifier.

Each of the child private keys 1003, 1005 and 1019 may further derive one or more grandchild keys. For example, the child key 1003 derives one or more grandchild key 1007, 1008 and 1009, and the child key 1005 derives one or more grandchild private keys 1013, 1014 and 1015. The ellipsis 1009 and 1015 represent that the number of grandchild private keys derived by the child private keys 1003 and 1005 may be any natural number. Each of the grandchild private keys 1007, 1008, 1009, 1013, 1014, and 1015 is associated with a permission 1010, 1011, 1012, 1016, 1017 or 1018 that is granted to a grandchild decentralized identifier (hereinafter referred to as a grandchild permission).

In some embodiments, each of grandchild permissions is a sub-scope of permission of its parent permission, and each of the grandchild permissions may overlap or not overlap with each other.

Figure 11:
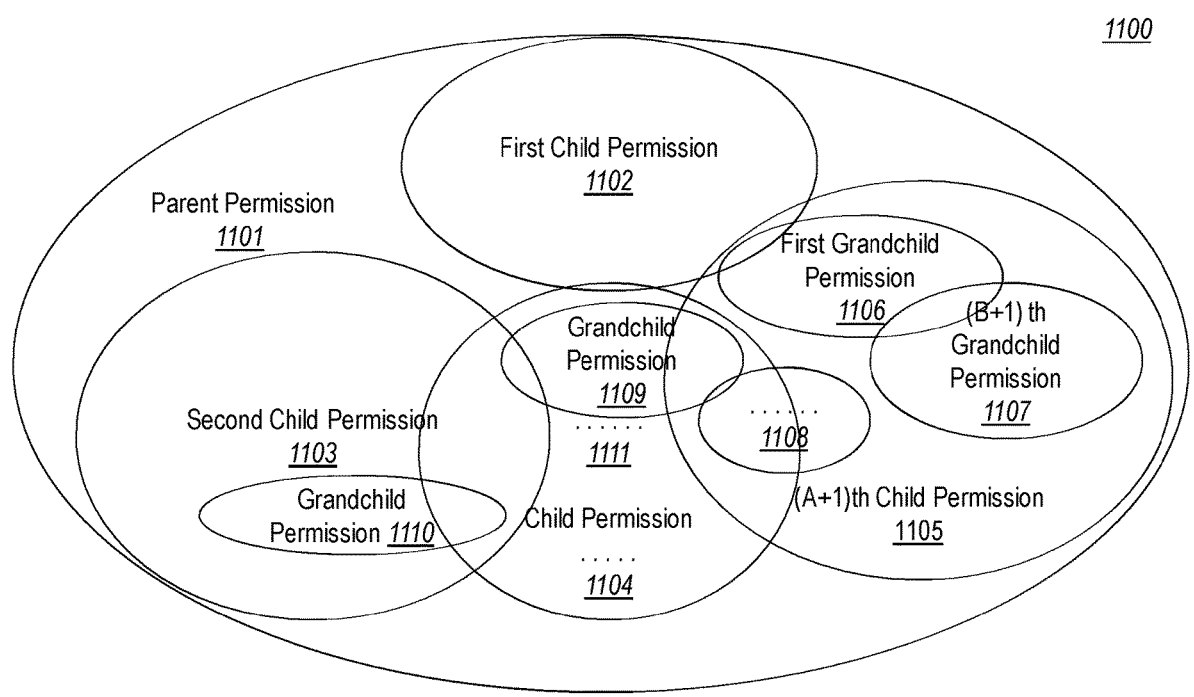
FIG. 11 illustrates example relations between a parent permission, its child permissions, and grandchild permissions.

Referring to FIG. 11, similar to FIG. 7, each of the ovals represents a scope of permission granted to a decentralized identifier. The largest oval represents the scope of the parent permission 1101 that is associated with the parent decentralized identifier. Each of the child permissions 1102, 1103, 1104 and 1105 is a permission associated with the child decentralized identifiers. Each of the child permissions 1102-1105 has a scope that is a subset of the scope of the parent permission 1101. A is 0 or any natural number. The ellipsis 1104 represents that there are any natural number A of child permissions, each of which corresponds to a child decentralized identifier. The first child permission 1102 overlaps with the (A+1)th child permission 1105, but not overlap with the second child permission 1103.

As illustrated in FIG. 11, there is no grandchild permission contained in the first child permission 1102, which means that the first child decentralized identifier has not derived any grandchild decentralized identifier yet. The second child permission 1103 includes a grandchild permission 1110, which means the second child decentralized identifier derived one grandchild decentralized identifier. The (A+1)th child permission 1205 includes (B+1) grandchild permissions 1106, 1107 and 1108, which means that the (A+1)th child decentralized identifier derived (B+1) grandchild decentralized identifiers. B is 0 or any natural number. The ellipsis 1108 represents that there may be any natural number (B+1) of grandchild permissions derived from the child permission 1105. Each of the (B+1) grandchild permissions is a subset of the (A+1)th child permission 1105. Similarly, the child permission 1104 includes a grandchild permission 1109 and 1111. The ellipsis 1111 represents that there may be 0 or any natural number of grandchild permissions within the child permission 1111, and the child decentralized identifier associated with the child permission 1111 may derive 0 or any natural number of grandchild decentralized identifiers.

As illustrated in FIG. 11, the first grandchild permission 1106 of the (A+1)th child permission 1104 overlaps with the (B+1)th grandchild permission 1107 of the (A+1)th child permission 1104, but not overlap with the grandchild permission 1108 of the (A+1)th child permission 1105. The grandchild permission 1108 of the (A+1)th child permission 1105 overlaps with the grandchild permission 1109 of child permission 1104. The grandchild permission 1110 of the second child permission 1103 does not overlap with any other grandchild permissions 1109, 1111, 1106, 1107, and 1108. As such, the DID management system allows entities to have a multi-level structured decentralized identifier. Accordingly, the grandchild permissions cannot be broader than their parent permissions, and the child permissions cannot be broader than the parent permission. Once the scope of parent permission is reduced or revoked, all the child permissions are also reduced or revoked. Similarly, once the parent decentralized identifier is revoked, all the descendant decentralized identifiers are revoked. For example, when a user loses his/her mobile device, the user may indicate the DID management system to revoke his/her parent decentralized identifier. After the parent decentralized identifier is revoked, there is no need to worry about the child, grandchild and/or any other decentralized identifiers that are linked to the parent decentralized identifier, because all the linked decentralized identifiers are also revoked.

Similarly, each grandchild private key may also derive great-grandchild private keys, each of which may be assigned as a private key for a great-grandchild decentralized identifier. And the great-grandchild decentralized identifier may be assigned to a scope of permission that is a subset of permission of its parent grandchild decentralized identifier, and so on and so forth.

Accordingly, the principle described herein allows entities to have a multi-level structured decentralized identifiers that are easier to manage. Each of the levels is granted a different scope of permissions, and within the same level, each of the decentralized identifiers is granted a particular scope of permissions within the level. Since the parent decentralized identifier is capable of regenerating each of its child decentralized identifiers, and each of the child decentralized identifiers is capable of regenerating each of the grandchild decentralized identifiers derived from that child decentralized identifier, private keys associated with each of the child, grandchild and/or other descendant decentralized identifiers are not required to be persisted, and each of the private keys of the descendant decentralized identifiers can be regenerated on the fly, such that the security of the descendant decentralized identifiers is improved, and the process of storing and backing up each of the descendant decentralized identifiers is simplified.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for creating and managing linked decentralized identifiers for a first entity on a decentralized identity platform, wherein each of the decentralized identifiers associated with the first entity comprises a scope of data and an associated permitted use of the scope of data for a second entity to access the scope of data, the computing system comprising:
   one or more processors; and
   one or more computer-readable media storing computer-executable instructions that, when executed by the one or more processors, cause the one or more processors to perform steps of:
   assigning a parent permission to a parent decentralized identifier, wherein the parent permission includes a first scope of data and a first associated permitted use of the first scope of data, and the parent decentralized identifier comprising a parent private key;
   determining that a child decentralized identifier is to be created for the parent decentralized identifier;
   retrieving the parent private key by accessing the parent decentralized identifier;
   in response to the determining that the child decentralized identifier is to be created for the parent decentralized identifier,
      generating a child private key based on the parent private key;
      creating the child decentralized identifier, wherein the creating the child decentralized identifier further comprises assigning the child private key to the child decentralized identifier; and
      assigning the child decentralized identifier a child permission including a second scope of data and a second associated permitted use of the second scope of data, wherein the first scope of data includes the second scope of data, and the first associated permitted use of the first scope of data includes the second associated permitted use of the second scope of data.

2. The computing system of claim 1, wherein the instructions that when executed by the one or more processors, further cause the one or more processors to perform a step of storing the parent private key offline.

3. The computing system of claim 1, wherein the instructions that when executed by the one or more processors further cause the one or more processors to perform a step of encrypting the parent private key.

4. The computing system of claim 1, wherein an entity associated with the child decentralized identifier also has at least one other decentralized identifier.

5. The computing system of claim 1, wherein the instructions that when executed by the one or more processors, further cause the one or more processors to perform a step of revoking the child permission associated with the child decentralized identifier.

6. The computing system of claim 5, wherein the instructions that when executed by the one or more processors, further cause the one or more processors to perform a step of reporting the revocation to a distributed ledger.

7. The computing system of claim 1, wherein the instructions that when executed by the one or more processors, further cause the one or more processors to perform steps of:
   determining that a grandchild decentralized identifier is to be created for the child decentralized identifier for the child decentralized identifier;
   in response to the determining that the grandchild decentralized identifier is to be created,
      generating a grandchild private key using the child private key;
      creating the grandchild decentralized identifier, wherein the creating the grandchild decentralized identifier further comprises assigning the grandchild private key to the grandchild decentralized identifier; and
      assigning the grandchild decentralized identifier a grandchild permission including a third scope of data and a third associated permitted use of the third scope of data, wherein the second scope of data includes the third scope of data, and the second associated permitted use of the second scope of data includes the third associated permitted use of the third scope of data.

8. The computing system of claim 7, the child decentralized identifier being a first child decentralized identifier, the child private key being a first child private key, wherein the instructions that when executed by the one or more processors, further cause the one or more processors to perform steps of:
   determining that a second child decentralized identifier is to be created for the parent decentralized identifier;
   in response to the determining that the second child decentralized identifier is to be created for the parent decentralized identifier,
      generating a second child private key using the parent private key;
      creating the second child decentralized identifier, wherein the creating the second child decentralized identifier further comprises assigning the second child private key to the second child decentralized identifier; and assigning the second child decentralized identifier a second child permission including a fourth scope of data and a fourth associated permitted use of the fourth scope of data, wherein the first scope of data includes the fourth scope of data, and the first associated permitted use of the first scope of data includes the fourth associated permitted use of the fourth scope of data.

9. The computing system of claim 1, the child decentralized identifier being a first child decentralized identifier, the child private key being a first child private key, wherein the instructions that when executed by the one or more processors, further cause the one or more processors to perform steps of:
determining that a second child decentralized identifier is to be created for the parent decentralized identifier;
in response to the determining that the second child decentralized identifier is to be created,
generating a second child private key using the parent private key;
creating the second child decentralized identifier, wherein the creating the second child decentralized identifier further comprises assigning the second child private key to the second child decentralized identifier; and
assigning the second child decentralized identifier a second child permission including a third scope of data and a third associated permitted use of the third scope of data, wherein the first scope of data includes the third scope of data, and the first associated permitted use of the first scope of data includes the third associated permitted use of the third scope of data.

10. A method for creating and managing linked decentralized identifiers for a first entity on a decentralized identity platform, wherein each of the decentralized identifiers associated with the first entity comprises a scope of data and an associated permitted use of the scope of data for a second entity to access the scope of data, the method comprising:
assigning, by a one or more processors, a parent permission to a parent decentralized identifier, wherein the parent permission includes a first scope of data and a first associated permitted use of the first scope of data, and the parent decentralized identifier comprising a parent private key;
determining, by the one or more processors, that a child decentralized identifier is to be created for the parent decentralized identifier;
in response to the determining that the child decentralized identifier is to be created for the parent decentralized identifier,
generating, by the one or more processors, a child private key based on the parent private key;
creating, by the one or more processors, the child decentralized identifier wherein the creating the child decentralized identifier further comprises assigning the child private key to the child decentralized identifier; and
assigning, by the one or more processors, the child decentralized identifier a child permission including a second scope of data and a second associated permitted use of the second scope of data, wherein the first scope of data includes the second scope of data, and the first associated permitted use of the first scope of data includes the second associated permitted use of the second scope of data.

11. The method of claim 10, further comprising:
revoking, by the one or more processors, the child permission associated with the child decentralized identifier; and
reporting, by the one or more processors, the revocation to a distributed ledger.

12. The method of claim 10, further comprising:
determining, by the one or more processors, that a grandchild decentralized identifier is to be created for the child decentralized identifier;
in response to the determining that the grandchild decentralized identifier is to be created for the child decentralized identifier,
generating, by the one or more processors, a grandchild private key using the child private key; and
creating, by the one or more processors, grandchild decentralized identifier, wherein the creating the grandchild decentralized identifier further comprises assigning the generated grandchild private key to the grandchild decentralized identifier.

13. The method of claim 12, the child decentralized identifier being a first child decentralized identifier, the child private key being a first child private key, wherein the method further comprises:
determining, by the one or more processors, that a second child decentralized identifier is to be created for the parent decentralized identifier;
in response to the determining that the second child decentralized identifier is to be created,
generating, by the one or more processors, a second child private key using the parent private key; and
creating, by the one or more processors, the second child decentralized identifier wherein the creating the second child decentralized identifier further comprises assigning the generated second child private key to the second child decentralized identifier.

14. The method of claim 10, the child decentralized identifier being a first child decentralized identifier, the child private key being a first child private key, wherein the method further comprises:
determining, by the one or more processors, that a second child decentralized identifier is to be created for the parent decentralized identifier;
in response to the determining that the second child decentralized identifier is to be created,
generating, by the one or more processors, a second child private key using the parent private key; and
creating, by the one or more processors, the second child decentralized identifier, wherein creating the second child decentralized identifier comprises assigning the generated second child private key to the second child decentralized identifier.

15. A computer program product for creating and managing linked decentralized identifiers for a first entity on a decentralized identity platform, wherein each of the decentralized identifiers associated with the first entity comprises a scope of data and an associated permitted use of the scope of data for a second entity to access the scope of data, the computer program product comprising one or more computer readable hardware storage media storing computer-executable instructions that, when executed by one or more processors of a computing system, cause the the one or more processors to perform steps of:
assigning a parent permission to a parent decentralized identifier, wherein the parent permission includes a first scope of data and a first associated permitted use of the first scope of data, and the parent decentralized identifier comprising a parent private key;
retrieving the parent private key by accessing the parent decentralized identifier;
determining that a child decentralized identifier is to be created for the parent decentralized identifier;
in response to the determining that the child decentralized identifier is to be created for the parent decentralized identifier,
  generating a child private key based on the parent private key;
  creating the child decentralized identifier, wherein the creating the child decentralized identifier further comprises assigning the child private key to the child decentralized identifier; and
  assigning the child decentralized identifier a child permission including a second scope of data and a second associated permitted use of the second scope of data, wherein the first scope of data includes the second scope of data, and the first associated permitted use of the first scope of data includes the second associated permitted use of the second scope of data.

* * * * *